United States Patent
Leidel

(10) Patent No.: US 12,129,130 B2
(45) Date of Patent: Oct. 29, 2024

(54) DEVICE AND METHOD FOR TRANSPORTING CONTAINERS

(71) Applicant: KRONES AG, Neutraubling (DE)

(72) Inventor: Marco Leidel, Neutraubling (DE)

(73) Assignee: KRONES AG, Neutraubling (DE)

( * ) Notice: Subject to any disclaimer, the term of this patent is extended or adjusted under 35 U.S.C. 154(b) by 491 days.

(21) Appl. No.: 17/497,237

(22) Filed: Oct. 8, 2021

(65) Prior Publication Data

US 2022/0112038 A1   Apr. 14, 2022

(30) Foreign Application Priority Data

Oct. 9, 2020  (DE) ..................... 10 2020 126 596.4

(51) Int. Cl.
*B65G 47/84*  (2006.01)

(52) U.S. Cl.
CPC .... *B65G 47/846* (2013.01); *B65G 2201/0244* (2013.01); *B65G 2207/08* (2013.01)

(58) Field of Classification Search
CPC ...... B65G 29/00; B65G 47/84; B65G 47/846; B65G 2201/0244; B65G 2207/08
USPC ...................................... 198/473.1
See application file for complete search history.

(56) References Cited

U.S. PATENT DOCUMENTS

| | | | | |
|---|---|---|---|---|
| 5,056,650 A | * | 10/1991 | Kronseder | B65G 47/846 198/723 |
| 5,784,857 A | * | 7/1998 | Ford | B65B 35/26 53/201 |
| 5,826,400 A | * | 10/1998 | Martin | B67C 7/004 53/367 |
| 7,007,793 B2 | * | 3/2006 | Stocchi | B65G 47/846 198/803.11 |
| 8,813,950 B2 | * | 8/2014 | Papsdorf | B65G 47/846 198/474.1 |
| 9,731,911 B2 | * | 8/2017 | Fahldieck | B65G 47/846 |

(Continued)

FOREIGN PATENT DOCUMENTS

| | | |
|---|---|---|
| CN | 104968588 | 10/2015 |
| DE | 69405650 | 2/1998 |

(Continued)

OTHER PUBLICATIONS

German Search Report dated May 3, 2021 for German Application No. 10 2020 126 596.4, 5 pages.

(Continued)

*Primary Examiner* — James R Bidwell
(74) *Attorney, Agent, or Firm* — .Haynes and Boone, LLP

(57) ABSTRACT

A device for transporting containers with a transport wheel, which includes: a central connection configured to fasten the transport wheel to a central rotational shaft, so that a rotation of the central rotational shaft about the rotational axis thereof is able to be transmitted to the transport wheel; a plurality of discs which are concentrically stacked one on top of the other relative to the rotational axis in the axial direction and which in each case have at least one recess, which jointly form a receiving region which is provided on an outer circumference of the transport wheel, wherein at least one of the discs is a fixed disc and at least one of the discs is an adjustment disc; and an adjustment mechanism which is configured to rotate the adjustment disc by an adjustment angle, whereby the size of the receiving region is adjustable.

18 Claims, 3 Drawing Sheets

(56) References Cited

U.S. PATENT DOCUMENTS

2003/0106779 A1* 6/2003 Stocchi ................ B65G 29/00
                                                 198/803.3
2016/0107845 A1* 4/2016 Bruch ................ B65G 21/2072
                                                 198/473.1

FOREIGN PATENT DOCUMENTS

| DE | 60114777 T2 | 8/2006 | | |
|---|---|---|---|---|
| DE | 102013112434 | 9/2014 | | |
| DE | 102013104082 A1 | 10/2014 | | |
| DE | 102013112656 | 5/2015 | | |
| DE | 102013113292 | 6/2015 | | |
| DE | 102014103956 | 9/2015 | | |
| EP | 2447194 | 5/2012 | | |
| FR | 2818626 | * | 6/2002 | ............ B65G 47/84 |
| WO | WO 2006/131463 | 12/2006 | | |
| WO | WO 2019/041702 A1 | 3/2019 | | |

OTHER PUBLICATIONS

Extended European Search Report mailed Mar. 2, 2022 in European application No. EP 21201654.7, 11 pages.
Chinese Office Action issued on Nov. 21, 2023 in Chinese Patent Application No. 202111179261.0.

* cited by examiner

DEVICE AND METHOD FOR TRANSPORTING CONTAINERS

CROSS-REFERENCE TO RELATED APPLICATIONS

This application claims priority from German Patent Application No. DE 10 2020 126 596.4, filed on Oct. 9, 2020 in the German Patent and Trademark Office, the disclosure of which is incorporated herein by reference in its entirety.

BACKGROUND

Technical Field

The present invention relates to a device and a method for transporting containers, for example in a beverage filling system, wherein the device has a transport wheel with at least one adjustable receiving region for a container.

Related Art

In beverage filling systems with a rotary design having a sequence of carousels connected in succession, the containers to be treated are generally transported by means of transfer stars between the carousels in which the containers are subjected to a treatment. For example, containers to be filled are filled in a filler carousel with a filling product and then closed in a downstream capper carousel. The transfer of the filled containers between the filler carousel and the capper carousel is generally carried out by means of one or more transfer stars.

To this end, the transfer star generally has a plurality of pockets which are designed to receive one respective container. By rotating the transfer star, the container which is held by the corresponding pocket and possibly an external guide is conveyed along a pitch circle of the transfer star.

The pocket size may be fixedly predetermined, wherein in this case the transfer star is only able to be used for a specific container size and/or container shape. In such a system, a change to a different container format is not possible in a simple manner and is associated with high acquisition costs and a high level of effort for converting the system.

For this reason, transfer stars with a changeable pocket size have been developed, see for example EP 2 447 194 A1 and DE 694 05 650 T2. The pockets in this case are formed by recesses of a plurality of discs which are located one above the other and which are adjustable or, respectively, rotatable relative to one another, whereby the pockets may be enlarged or reduced depending on requirements. In the prior art it is regarded as important that the adjustment is carried out such that the position of the pockets in the circumferential direction of the transfer star, i.e., also the position of a hypothetically inserted container, and the pitch between the pockets remain unchanged during the adjustment. Otherwise, the synchronicity relative to upstream and/or downstream transfer stars or carousels and the relative positions from any further receiving portions, for example for holding neck regions of the containers, could be lost.

The adjustment of the pocket size, maintaining the pocket position in the circumferential direction and maintaining the pitch between adjacent pockets, is achieved in the aforementioned prior art by the discs forming the pockets being rotated by symmetrical angles in opposing directions during the adjustment. A drawback of these methods is in the relatively complex mechanism. Thus, the rotation of a spindle has to be actuated manually or via an actuator, such as for example a servomotor, converted via a mechanism into a scissor-like movement of the discs. The reliability of the adjustment, however, may be impaired by a possible self-locking of the mechanism for the scissor-like deflection. Moreover, the complex mechanism and the tolerances associated therewith counteract an accurate setting of the pockets to different container formats.

SUMMARY

A device which is suitable for the transport of containers of different formats with improved reliability according to various embodiments is described herein.

The device serves for the transportation of containers and it is used for example in a beverage filling system, thus for example for filling (still or carbonated) water, soft drinks, beer, wine, juice, smoothies, dairy products, mixed beverages and the like.

The device is implemented with a rotary design and to this end has a transport wheel with a central connection which is configured to fasten the transport wheel to a central rotational shaft which has a rotational axis, so that a rotation of the central rotational shaft about the rotational axis thereof is able to be transmitted to the transport wheel. The device further comprises a plurality of discs which are concentrically stacked one on top of the other relative to the rotational axis in the axial direction and which in each case have at least one recess, which jointly form a receiving region which is provided on an outer circumference of the transport wheel and which is configured to receive at least partially a container. The one or more receiving regions are, for example, recesses, depressions, pockets or the like, in order to hold at least partially one respective container, for example a base body thereof, such as for example a bottle body. By rotating the transport wheel, therefore, the containers may be transported along a circular track. In this context, the receiving regions also function as guide regions, wherein the containers optionally may be supported or, respectively, guided radially inwardly by a stationary external guide.

It should be mentioned that the terms such as "receiving region", "recess", "container" and others, are often used in the singular for the sake of linguistic simplicity. The plural is encompassed therein, however, if it is not technically or expressly excluded. Thus, the transport wheel generally has a plurality of receiving regions in order to be able to transport a plurality of containers at the same time.

According to the various embodiments, at least one of the discs is a fixed disc which is fixed via a supporting structure relative to the connection and at least one of the discs is an adjustment disc which is rotatably mounted about the rotational axis relative to the fixed disc. The transport wheel also has an adjustment mechanism which is configured to rotate the adjustment disc by an adjustment angle relative to the fixed disc, whereby the size of the receiving region is changeable. The adjustment disc is thus rotatably mounted via the adjustment mechanism at least by a maximum adjustment angle which corresponds, for example, to the maximum size of the receiving region.

Since one or more adjustment discs are rotated relative to one or more fixed discs for setting the size of the receiving region via the adjustment mechanism, the mechanism for the adjustment may be considerably simplified. A scissor-like mechanical deflection of the force provided to the adjustment mechanism is no longer required. The reduction in the mechanical complexity is associated with an improvement in the reliability and the accuracy of the setting and a cost-saving due to fewer components. The assembly of the device is simplified.

In certain embodiments, the transport wheel comprises exactly three discs, wherein two thereof are fixed discs and one of the discs is an adjustment disc which, when viewed in the axial direction of the rotational axis, is arranged between the two fixed discs. In other words, the adjustment disc is provided in a sandwich-like manner between the two fixed discs, whereby the receiving region is formed by a total of three recesses. The walls of the axially outer recesses of the two fixed discs stabilize the container, so that by the action of the wall of the central recess of the adjustment disc from the other side the container is not able to tip over. Moreover, only a single disc has to be adjusted in order to adapt the receiving region to different container formats. Thus, the container may be safely and reliably held and transported by a small degree of effort in terms of mechanical engineering.

In an alternative, two adjustment discs and one fixed disc may also be provided.

In some embodiments, the discs have an equal number of recesses in order to form the receiving regions in a well-defined manner. Additionally or alternatively, the recesses may be arranged at a uniform angular spacing and/or have the same shape, whereby the production, assembly and operation of the device are simplified. The recesses may be, for example, semi-circular pockets, i.e. depressions relative to the outer circumference. In this case, the maximum size and shape of the receiving region correspond to the size and shape of the recesses forming the receiving region. The maximum size could be specified here by the radius or diameter of the semi-circular recesses.

In several embodiments, the adjustment mechanism has a rotary adjustment actuator which is fixedly mounted on the supporting structure, wherein the adjustment actuator comprises an electric motor with an output shaft which permits the control of the angular position of the output shaft. In this manner, the adjustment angle may be reliably and accurately set without a high degree of mechanical effort. The electric motor is, for example, a step motor, servomotor or torque motor, wherein a step motor is used in an exemplary embodiment in the present application.

The adjustment actuator is generally supplied with power via a slip ring, which may be located above the transport wheel. The adjustment actuator is generally implemented as a servomotor or comprises such a servomotor which retrieves or, respectively, is able to set a desired angular position without a reference movement. The adjustment actuator is typically fastened without a housing on the transport wheel, in particular to the supporting structure. In certain embodiments, the adjustment actuator and the associated components of the adjustment mechanism are resistant relative to the media used in the device. The adjustment and the generation of the counter torque takes place via the pinion on the output shaft, and the gearwheel and the toothed rod on the transport wheel.

In various embodiments, a pneumatic cylinder is provided in the transport wheel, said pneumatic cylinder being configured to ensure, in particular in the case of larger forces, that no undesired adjustment occurs on the transport wheel. Such an anti-adjustment device, which is not shown in the figures, may also be implemented in a different manner and is useful, in particular, in the case of high speeds and/or large containers, for example bottles larger than 1.25 L.

In some embodiments, the adjustment mechanism has a pinion which is fixedly connected to the output shaft of the rotary adjustment actuator and is able to be set in rotation thereby, as well as a toothed rod which is in toothed engagement with the pinion and which by rotating the pinion is movable in a translational manner, typically along a circular arc, wherein the toothed rod is fixedly mounted on the adjustment disc. In this manner, the adjustment disc is adjustable/rotatable by a specific adjustment angle relative to the fixed discs, via an adjustment mechanism which is simple and reliable in terms of mechanical engineering.

The spacing between adjacent receiving regions might be denoted herein as the "pitch". The pitch may be measured or, respectively, specified for example as the angular spacing or arc length. As the adjustment discs are rotated relative to the fixed discs, for setting the pocket size, i.e. in particular the dimensions of the receiving regions in the circumferential direction, the radial line of symmetry of the receiving regions is displaced, if such a line of symmetry is present. In other words, the position of the receiving regions and thus the position of a received container, i.e. its cylinder axis in the case of a cylindrical container, is displaced with the adjustment in the circumferential direction. This displacement might also be denoted herein as the "pitch offset". The "pitch offset" is also well-defined in the case of only a single receiving region, since it denotes the relative displacement of a receiving region but not the spacing between adjacent receiving regions.

In certain embodiments, the transport wheel is configured such that a pitch offset, caused by rotating the adjustment disc relative to the fixed disc by the adjustment angle, may be manually and/or automatically compensated. In other words, the transport wheel permits a correction of the pitch offset. Since one or more adjustment discs are rotated relative to the one or more fixed discs for setting the size of the receiving region, and also a correction of the pitch offset is carried out, not only is the mechanism for the adjustment able to be considerably simplified but the position of the receiving regions relative to other devices or components and the pitch between the receiving regions remain unchanged. In this manner, the synchronicity relative to upstream and/or downstream transport stars or carousels and relative positions to any further receiving portions, for example for holding neck regions of the containers, may be maintained without further work.

It should be mentioned that the compensation of the pitch offset may be carried out before and/or during and/or after the adjustment of the adjustment disc relative to the fixed disc. The compensation generally means that the transport wheel as a whole, i.e. including all of the discs, is rotated by a specific correction angle in a direction opposing the adjustment angle. The value of the correction angle in this case may be equal to the value of the adjustment angle; but it is also possible that depending on the containers to be transported and/or process and/or machine parameters the correction deviates therefrom.

In some embodiments, the device further comprises a drive which is configured to set the central rotational shaft in rotation. The drive in this case is an electric motor or comprises such an electric motor, which permits the control of the angular position of the central rotational shaft. In particular a step motor, servomotor or torque motor, generally a step motor, is relevant. Thus the drive forms a main drive which sets the transport wheel as a whole in rotation for the transport of the containers.

The drive may be configured to compensate for the pitch offset. According to this embodiment, the drive functions not only as a main drive but it also undertakes synergistically the function of compensating for the pitch offset, whereby the device may be implemented in a particularly simple and reliable manner in terms of mechanical engineering.

In some embodiments, the device has a controller which is in communication with the drive and the adjustment mechanism, and which is configured to activate the adjustment mechanism such that the adjustment disc is rotated by the adjustment angle relative to the fixed disc and to activate the drive such that the pitch offset caused thereby is compensated. The controller communicates in a wireless or wired manner with the corresponding components and may be a programmable computer-assisted apparatus. The controller may be implemented as a centralized or decentralized computer unit, it may operate autonomously or be part of a process control, make use of cloud-based or internet-based applications, etc.

In various embodiments, the controller is configured to determine a correction angle from the adjustment angle and to activate the drive such that the position of the receiving region on the outer circumference is corrected by the correction angle. The correction angle may be determined, for example calculated, as a function of one or more process and/or machine parameters and/or container-dependent parameters, or taken from a table.

In several embodiments, the controller is configured to receive an input relative to the adjustment angle or to determine this adjustment angle, for example from the aforementioned process and/or machine parameters and/or container-dependent parameters, and to activate the adjustment mechanism correspondingly such that the adjustment disc is rotated relative to the fixed disc by the adjustment angle. In this manner, the pitch offset may be compensated fully automatically.

A method for transporting containers, for example in a beverage filling system, according to various embodiments, is also described. The method uses a device or, respectively, a transport wheel according to one of the variants set forth above. The method comprises: transferring a container to the receiving region of the transport wheel, transporting the container along a circular track by rotating the transport wheel about the central rotational axis and removing the container from the receiving region; rotating the adjustment disc by an adjustment angle relative to the fixed disc in order to change the size of the receiving region. The steps of transport and adjustment may be carried out in any sequence and order.

The features, technical effects, advantages and exemplary embodiments which have been described relative to the device and the transport wheel apply equally to the method.

Thus for the aforementioned reasons a pitch offset, caused by rotating the adjustment disc relative to the fixed disc by the adjustment angle, is generally manually and/or automatically compensated, in particular by the transport wheel being rotated as a whole by a correction angle in a direction opposing the adjustment angle.

In some embodiments, for the aforementioned reasons the compensation of the pitch offset is carried out via the drive, in particular by the transport wheel being rotated as a whole by the drive by a correction angle in a direction opposing the adjustment angle.

Further advantages and features of the present invention are apparent from the following description of exemplary embodiments. The features described therein may be implemented individually or in combination with one or more of the features set forth above, provided the features do not contradict one another. The following description of exemplary embodiments is carried out in this case with reference to the accompanying drawings.

BRIEF DESCRIPTION OF THE FIGURES

Further embodiments of the invention are described in more detail by the following description of the figures.

DETAILED DESCRIPTION

Figure 1:
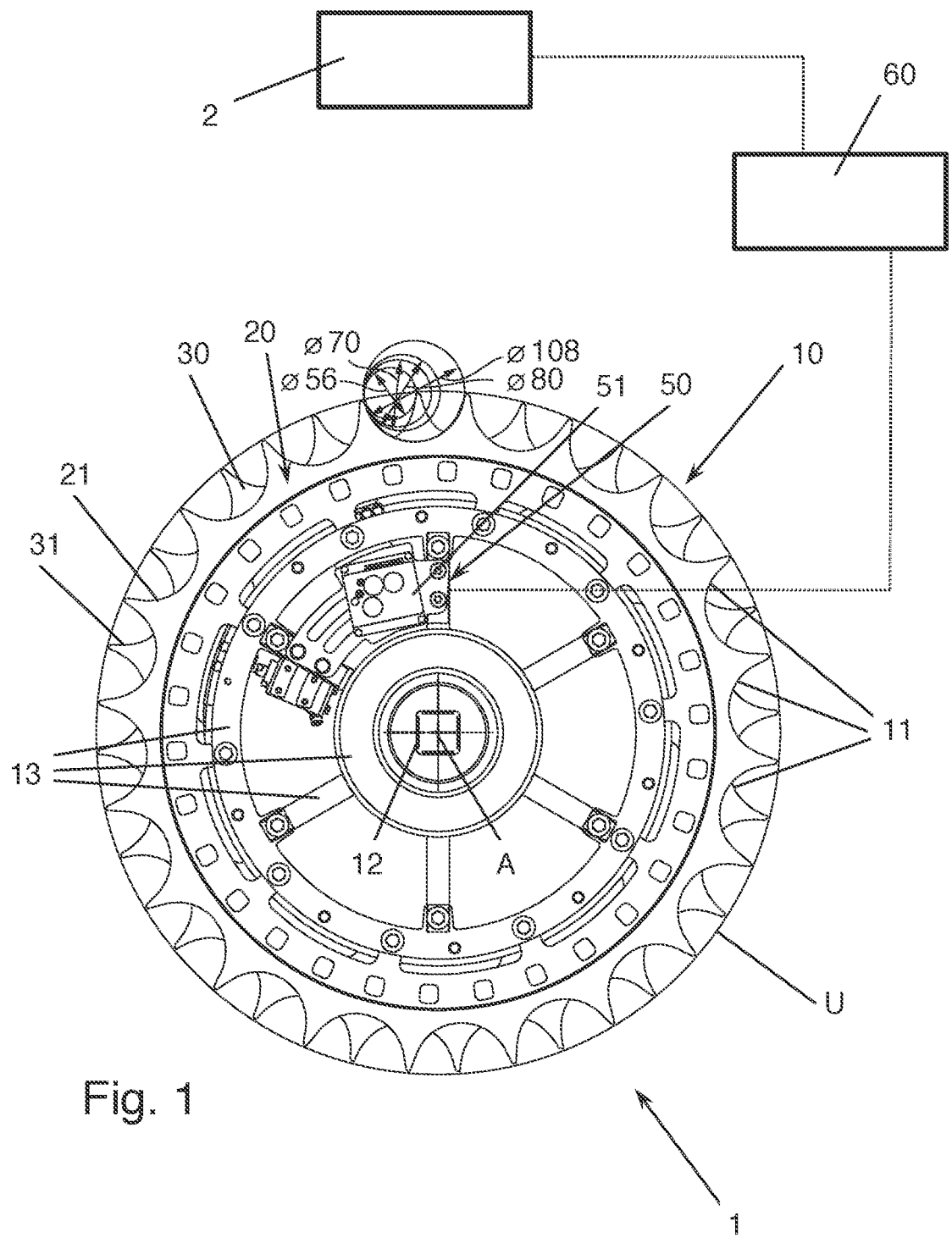
FIG. 1 shows a plan view of a transport wheel of a device for transporting containers.

Exemplary embodiments are described hereinafter by way of the figures. In this case, elements which are the same, similar or which have the same function are provided in the various figures with identical reference numerals, and a repeated description of these elements is dispensed with in some cases in order to avoid redundancy.

Figure 2:
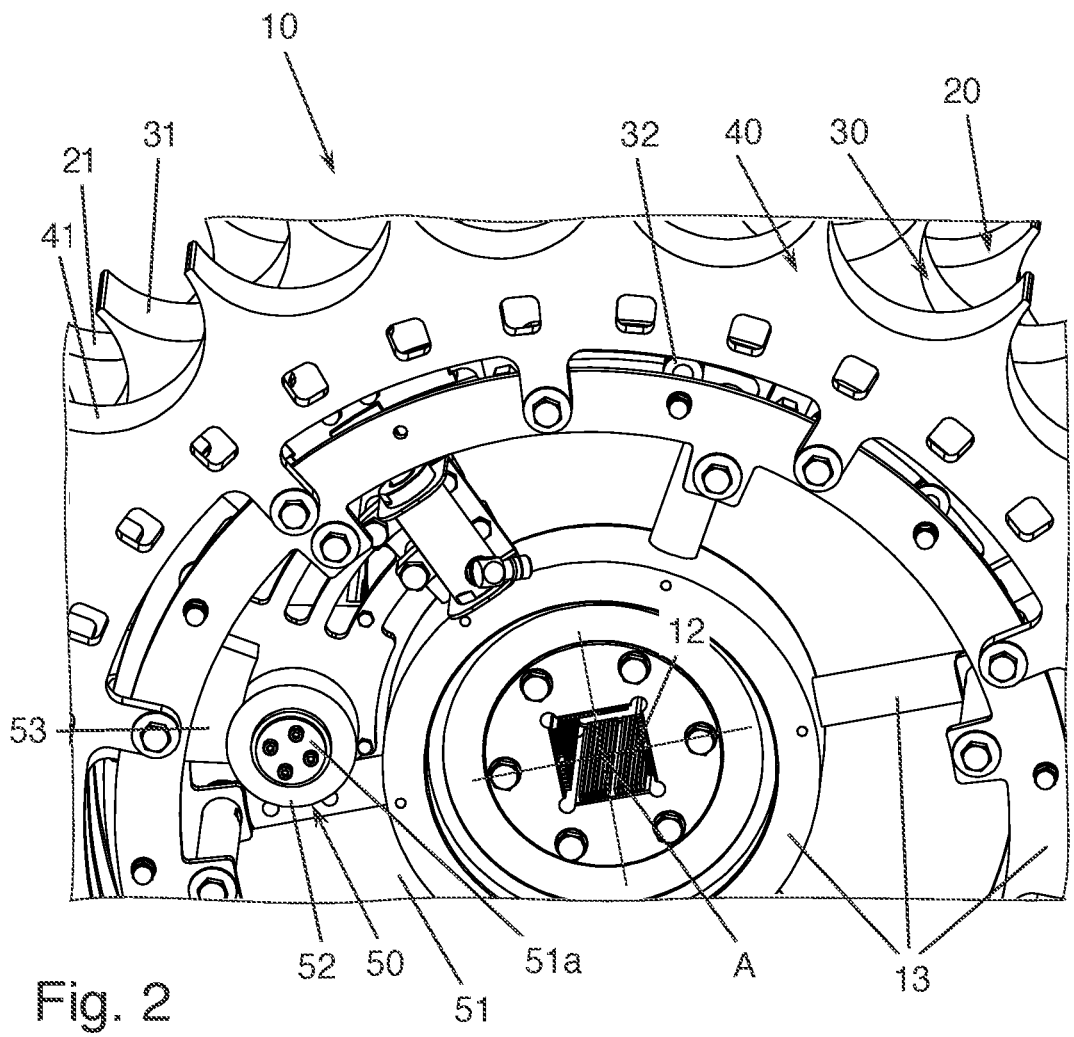
FIG. 2 shows a detail of the transport wheel of the device for transporting containers viewed from below.
Figure 3:
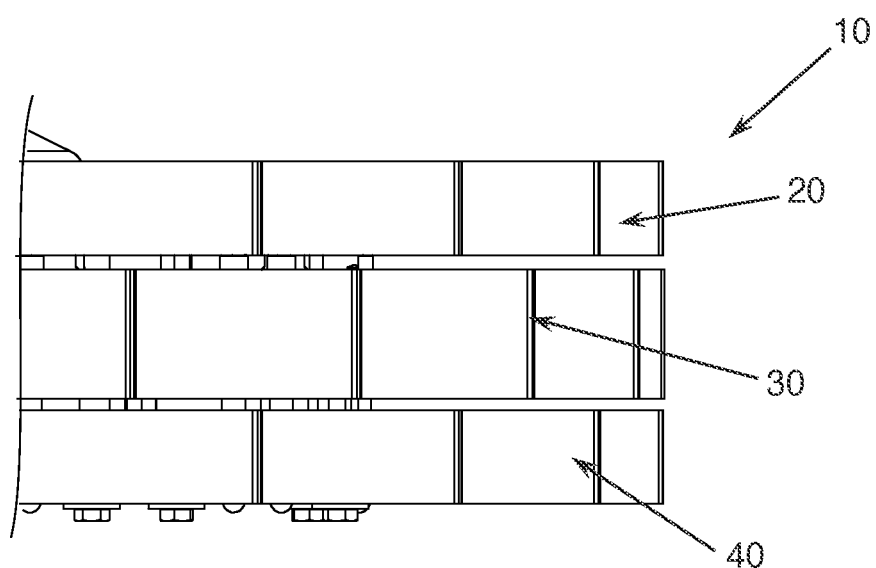
FIG. 3 shows a side view of the transport wheel of the device for transporting containers.

FIGS. 1 to 3 show from various perspectives a device 1 for transporting containers, which are not shown in the figures.

The device 1, also denoted as the "transfer star", is generally used in a container treatment system and serves therein for the transport of the containers, for example from one treatment station to the next treatment station. In this manner, a transfer of the containers may be achieved between treatment carousels (not shown in the figures) which provide various treatment options. The respective treatment carousel may provide, for example, one or more of the following treatment options: filling the containers with a filling product, closing the filled containers in each case with a closure, pivoting, rotating, labelling, shrink-wrapping, blow-moulding, stretch blow-moulding, opening, dome cutting, cleaning, sterilizing, activating, rinsing (gaseous and/or fluid), flush-off showering, warming, heating, cooling, blowing out, flame treating, removing electrostatic charge, pre-filling, final filling, pre-closing with a pre-closure, attaching a first closure part and/or attaching a second closure part. Generally, the device 1 is used in a beverage filling system, for example for filling (still or carbonated) water, soft drinks, beer, wine, juice, smoothies, dairy products, mixed beverages, and the like.

A plurality of devices 1 may also be arranged one behind the other in the container treatment system, whereby a serpentine-shaped transport path is formed, for example between two container treatment carousels.

The device 1 has a transport wheel 10, a plurality of receiving regions 11 which are configured to receive containers being provided on the outer circumference U of said transport wheel. The receiving regions 11 are recesses, depressions, pockets or the like, in order to encompass at least partially one respective container, for example a base body thereof, such as for example a bottle body. By rotating the transport wheel 10, the containers are thus transported along a circular track. Thus the receiving regions 11 are also guide regions, wherein the containers may be optionally supported or, respectively, guided radially inwardly by a stationary external guide, not shown in the figures, so that during the transport the containers remain securely in the receiving regions 11 and do not move outwardly.

The transport wheel 10 is fixedly connected via a central connection 12 to a central rotational shaft (not shown in the figures) so that a rotation of the central rotational shaft about the dedicated rotational axis A is transmitted to the transport wheel 10. The transport wheel 10 is generally adjustable in terms of height, i.e. in the axial direction. The central rotational shaft is set in rotation via a drive 2 which is shown schematically in FIG. 1. The drive 2 is typically an electric motor, such as for example a step motor, servomotor or torque motor, which permits the control of the angular position.

The transport wheel 10 comprises a plurality of discs 20, 30, 40, in the present exemplary embodiment three, which typically have the same outer circumference U and which are concentrically stacked one on top of the other relative to one and the same rotational axis A in the axial direction. The transport wheel 10 also has a supporting structure 13 which, as shown in FIGS. 1 and 2, may be configured in the manner of spokes and which is configured to connect the discs 20, 30, 40 to the connection 12, such that the rotation of the central rotational shaft may be transferred to the discs 20, 30, 40 as a whole.

The discs 20, 30, 40 have in each case relative to the outer circumference U a plurality of recesses 21, 31, 41 which in cooperation form the receiving regions 11. In other words, one respective recess 21, 31, 41 of the discs 20, 30, 40, thus in the present exemplary embodiment a total of three recesses 21, 31, 41, jointly form a receiving region 11. The recesses 21, 31, 41 are configured as indentations, depressions, pockets or the like. The number of recesses 21 of the first disc 20, the number of recesses 31 of the second or, respectively, central disc 30 and the number of recesses 41 of the third disc 40 are generally equal and they are also typically equal to the number of receiving regions 11. Moreover, the recesses 21, 31, 41 may have the same shape and a uniform spacing from one another.

One or more of the discs 20, 30, 40, generally the two outer discs 20, 40, are fixed relative to the connection 12, i.e. also to the central rotational shaft. These fixed discs 20, 40 are also denoted herein as "fixed discs" and are characterized in that they are not adjustable relative to the connection 12 and thus relative to the central rotational shaft in the circumferential direction.

Accordingly, at least one of the discs 20, 30, 40, generally the central disc 30, is adjustable relative to the fixed discs 20, 40. This adjustable disc 30 is also denoted herein as the "adjustment disc" and is characterized in that it is adjustable relative to the fixed discs 20, 40 and thus relative to the connection 12 and the central rotational shaft in the circumferential direction, at least by a specific maximum adjustment angle. To this end, the adjustment disc 30 is typically slidably mounted via one or more, for example ten, slide bearings 32.

The adjustment disc 30 is adjusted via an adjustment mechanism 50. The adjustment mechanism 50 comprises a rotary adjustment actuator 51 which has an output shaft 51a, which is fixedly mounted on the supporting structure 13 and which is generally implemented as an electric motor, which permits the control of the angular position. In particular, in this case a step motor, servomotor or torque motor is relevant. According to the present exemplary embodiment, the adjustment mechanism 50 also has a pinion 52 which is fixedly connected to the output shaft 51a of the rotary adjustment actuator 51 and may be set in rotation thereby, as well as a toothed rod 53 which is in toothed engagement with the pinion 52 and by rotating the pinion 52 is moved in a translational manner, generally along a circular arc. The toothed rod 53 in turn is fixedly mounted on the adjustment disc 30, whereby the adjustment disc 30 is adjustable or, respectively, rotatable via the adjustment mechanism 50 relative to the fixed discs 20, 40 by an adjustment angle.

The adjustment actuator 51 is generally supplied with power via a slip ring which is located above the transport wheel 10. The adjustment actuator 51 may be implemented as a servomotor which retrieves or, respectively, is able to set a desired angular position without a reference movement. The adjustment actuator 51 is typically fastened without a housing on the transport wheel 10, in particular to the supporting structure 13. In some embodiments, the adjustment actuator 51 and the associated components of the adjustment mechanism 50 are resistant relative to the media used in the device 1. The adjustment and the generation of the counter torque take place via the pinion 52 on the output shaft 51a, and the gearwheel and the toothed rod 53 on the transport wheel 10.

In various embodiments, a pneumatic cylinder is provided in the transport wheel 10, said pneumatic cylinder being configured to ensure, in particular in the case of larger forces, that no undesired adjustment occurs on the transport wheel 10. Such an anti-adjustment device, which is not shown in the figures, may also be implemented in a different manner and is useful, in particular, in the case of high speeds and/or large containers, for example bottles larger than 1.25 L.

Since the adjustment disc 30 is adjusted relative to the fixed discs 20, 40, the size of the receiving regions 11 may be changed, as is shown in FIG. 1 with different container diameters—the numerical values indicating exemplary container diameters in millimeters.

As the adjustment disc 30 is rotated relative to the fixed discs 20, 40 for setting the pocket size, i.e. the dimensions of the receiving regions 11 in the circumferential direction, the radial line of symmetry of the receiving regions 11 is displaced, if such a line of symmetry is present. In other words, the position of the receiving regions 11 and thus the position of a received container, i.e. its cylinder axis in the case of a cylindrical container, is displaced in the circumferential direction as is revealed in FIG. 1 by the container diameters shown by way of example. This displacement is also denoted herein as the "pitch offset".

If required, the pitch offset may be compensated, for example by considering at least one machine or process parameter, such as for example a container-dependent parameter and/or adjustment angle-dependent parameter. This compensation may be carried out manually, by the transport wheel 10 being aligned relative to a stationary reference point.

Alternatively or additionally, the drive 2 of the central rotational shaft may be used in order to correct the pitch offset. If the drive 2 comprises an electric motor, such as for example a step motor, servomotor or torque motor, which permits the control of the angular position, the correction is possible in a simple and reliable manner in terms of mechanical engineering, depending on the containers to be transported or, respectively, the adjustment angle applied.

To this end, the device 1 generally comprises a controller 60 which communicates in a wireless or wired manner with the central drive 2 and the adjustment actuator 51. The adjustment actuator 51 may thus be configured in order to transmit to the controller 60 the current adjustment angle of the adjustment disc 30 or an adjustment angle difference relative to a reference angle. The controller 60 determines therefrom a correction angle and activates the drive 2 such that the receiving region 11 is corrected by the correction angle. Alternatively, the current adjustment angle may be tracked and recorded by the controller 60 such that a transmission of information from the adjustment actuator 51 to the controller 60 is not necessarily required.

The correction or, respectively, compensation of the adjustment angle may be further automated by the controller

60 receiving or determining an input relative to the angle to be adjusted, for example from one or more container-dependent parameters of the containers to be transported. Container-dependent parameters may contain information about the format, the size, the diameter, the geometry and/or the like, of the containers. The controller 60 thus determines therefrom the adjustment angle and correspondingly activates the adjustment actuator 51 and the drive 2 for the correction of the pitch offset.

According to an alternative variant, the correction of the pitch offset may be carried out without knowledge of the adjustment angle or, respectively, a computer calculated use of the adjustment angle, by the correction being performed relative to a fixed reference point. For example, the transport wheel 10 may be rotated manually or by the control device 60 for the correction, such that the radial line of symmetry of a receiving region 11 or a different suitable point of the receiving region 11 coincides with a fixed reference point on the stationary system part.

Since one or more adjustment discs 30 are rotated relative to one or more fixed discs 20, 40 for setting the pocket size, wherein both the adjustment discs 30 and the fixed discs 20, 40 in each case have recesses 21, 31, 41 which jointly form the pockets or, respectively, receiving regions 11, and a correction of the pitch offset is carried out, the mechanism for the adjustment may be considerably simplified. A scissor-like mechanical deflection of the force provided by the adjustment actuator 51 is no longer required. A reduction in the mechanical complexity is associated with an improvement in the reliability and the accuracy of the setting and a cost-saving due to fewer components. The assembly of the device 1 is simplified. By a height adjustment of the transport wheel 10 the device 10 is able to be adapted in a variable manner in terms of height and to different diameters/formats of the containers to be transported.

If applicable, all of the individual features which are shown in the exemplary embodiments may be combined together and/or exchanged without departing from the scope of the invention.

What is claimed is:

1. A device for transporting containers comprising:
   a transport wheel, which comprises:
      a central connection configured to fasten the transport wheel to a central rotational shaft, wherein a rotation of the central rotational shaft about a central rotational axis thereof is configured to be transmitted to the transport wheel;
      a plurality of discs that are concentrically stacked one on top of the other relative to the central rotational axis in an axial direction, wherein:
         each disc from the plurality of discs comprises at least one recess,
         the at least one recess of each disc jointly form a receiving region that is provided on an outer circumference of the transport wheel, the receiving region configured to receive at least partially a container,
         the plurality of discs comprises three discs, and the three discs comprise two fixed discs and one adjustment disc,
         the one adjustment disc, when viewed in an axial direction of the central rotational axis, is arranged between the two fixed discs,
         at least one of the two fixed discs is fixed via a supporting structure relative to the central connection, and
         the one adjustment disc is rotatably mounted about the central rotational axis relative to the two fixed discs; and
      an adjustment mechanism configured to rotate the one adjustment disc by an adjustment angle relative to the two fixed discs, wherein a size of the receiving region is adjustable.

2. The device of claim 1, wherein each disc from the plurality of discs has an equal number of recesses, all recesses of the plurality of discs have a same shape, and/or the recesses of one disc from the plurality of discs are arranged at a uniform angular spacing.

3. The device of claim 2, wherein all recesses of the plurality of discs have the same shape, and the shape is semi-circular.

4. The device of claim 1, wherein the adjustment mechanism comprises a rotary adjustment actuator that is fixedly mounted on a support structure, and the rotary adjustment actuator comprises an electric motor with an output shaft configured to control an angular position of an output shaft of the rotary adjustment actuator.

5. The device of claim 4, wherein the electric motor comprises a step motor, a servomotor, or a torque motor.

6. The device of claim 4, further comprising a slip ring, wherein the slip ring supplies the electric motor with power.

7. The device of claim 4, wherein the adjustment mechanism further comprises a pinion that is fixedly connected to the output shaft and configured to be set in rotation thereby, and a toothed rod that is in toothed engagement with the pinion, wherein rotating the pinion moves the toothed rod in a translational manner.

8. The device of claim 7, wherein the toothed rod moves along a circular arc and is fixedly mounted on the one adjustment disc.

9. The device of claim 1, wherein the transport wheel is configured such that a pitch offset, caused by rotating the one adjustment disc relative to the two fixed discs by the adjustment angle, may be manually and/or automatically compensated.

10. The device of claim 9, further comprising a drive configured to set a central rotational shaft in rotation, wherein the drive comprises an electric motor that permits control of an angular position of the central rotational shaft.

11. The device of claim 10, wherein the drive is configured to compensate for the pitch offset.

12. The device of claim 11, further comprising a controller in communication with the drive and the adjustment mechanism, wherein the controller is configured to activate the adjustment mechanism such that that the one adjustment disc is rotated by the adjustment angle relative to the two fixed discs and to activate the drive such that the pitch offset caused thereby is compensated.

13. The device of claim 12, wherein the controller is further configured to determine a correction angle from the adjustment angle and to activate the drive such that a position of the receiving region on the outer circumference is corrected by the correction angle.

14. The device of claim 12, wherein the controller is further configured to receive an input relative to the adjustment angle or to determine an adjustment angle from one or more process parameters, machine parameters, and/or container-dependent parameters, and to activate the adjustment mechanism correspondingly such that the one adjustment disc is rotated relative to the two fixed discs by the adjustment angle.

15. A method for transporting containers using a device comprising:

a transport wheel, which comprises:
- a central connection configured to fasten the transport wheel to a central rotational shaft, wherein a rotation of the central rotational shaft about a central rotational axis thereof is configured to be transmitted to the transport wheel;
- a plurality of discs that are concentrically stacked one on top of the other relative to the central rotational axis in an axial direction, wherein:
  - each disc from the plurality of discs comprises at least one recess,
  - the at least one recess of each disc jointly form a receiving region that is provided on an outer circumference of the transport wheel, the receiving region configured to receive at least partially a container,
  - the plurality of discs comprises three discs, and the three discs comprise two fixed discs and one adjustment disc,
  - the one adjustment disc, when viewed in an axial direction of the central rotational axis, is arranged between the two fixed discs,
  - at least one of the two fixed discs is fixed via a supporting structure relative to the central connection, and
  - the one adjustment disc is rotatably mounted about the central rotational axis relative to the two fixed discs; and
- an adjustment mechanism configured to rotate the one adjustment disc by an adjustment angle relative to the two fixed discs, wherein a size of the receiving region is adjustable, wherein the method comprises:

transferring a container to the receiving region of the transport wheel;

transporting the container along a circular track by rotating the transport wheel about the central rotational axis and removing the container from the receiving region; and rotating the one adjustment disc by an adjustment angle relative to the two fixed discs to adjust the size of the receiving region.

16. The method of claim 15, further comprising manually and/or automatically compensating a pitch offset, caused by rotating the one adjustment disc relative to the two fixed discs by the adjustment angle.

17. The method of claim 16, wherein compensating the pitch offset comprises rotating the transport wheel by a correction angle in a direction opposing the adjustment angle.

18. The method of claim 17, wherein the device further comprises a drive configured to set a central rotational shaft in rotation, the drive comprises an electric motor that permits control of an angular position of the central rotational shaft, and the transport wheel is rotated by the drive.

* * * * *